US005695801A

United States Patent [19]

Oh

[11] Patent Number: 5,695,801

[45] Date of Patent: Dec. 9, 1997

[54] METHOD OF MAKING SHELF STABLE MOIST PASTA

[75] Inventor: Nam H. Oh, Warren, N.J.

[73] Assignee: CPC International Inc., Englewood Cliffs, N.J.

[21] Appl. No.: 371,316

[22] Filed: Jan. 11, 1995

Related U.S. Application Data

[63] Continuation of Ser. No. 67,185, May 26, 1993, abandoned.

[51] Int. Cl.[6] .......................... A23L 3/00; A23L 3/3454; A23L 1/16

[52] U.S. Cl. .......................... 426/325; 426/326; 426/335; 426/557

[58] Field of Search .......................... 426/324–326, 426/557, 335

[56] References Cited

U.S. PATENT DOCUMENTS

| | | | |
|---|---|---|---|
| 3,655,401 | 4/1972 | Halik . | |
| 4,529,609 | 7/1985 | Gaehring et al. | 426/532 |
| 4,540,590 | 9/1985 | Harada et al. | 426/324 |
| 4,597,976 | 7/1986 | Doster et al. | 426/325 |
| 4,599,238 | 7/1986 | Saitoh et al. | 426/557 |
| 4,659,576 | 4/1987 | Dahle et al. | 426/557 |
| 4,734,291 | 3/1988 | Raffensperger | 426/325 |
| 4,789,553 | 12/1988 | McIntyre et al. | 426/325 |
| 4,828,852 | 5/1989 | Hsu et al. | 426/557 |
| 5,134,926 | 8/1992 | DeFrancisci | 99/355 |

FOREIGN PATENT DOCUMENTS

| | | | |
|---|---|---|---|
| 0275717 | 7/1988 | European Pat. Off. | 426/557 |
| 0415788 | 8/1990 | European Pat. Off. . | |
| 51-7727 | 3/1976 | Japan | 426/557 |
| 53-18756 | 2/1978 | Japan | 426/557 |
| 53-37423 | 10/1978 | Japan | 426/557 |
| 56-158066 | 12/1981 | Japan | 426/557 |
| 57-170155 | 10/1982 | Japan | 426/557 |
| 57-206350 | 12/1982 | Japan | 426/557 |
| 58-11182 | 3/1983 | Japan | 426/557 |
| 58-183053 | 10/1983 | Japan | 426/557 |
| 59-88057 | 5/1984 | Japan | 426/557 |
| 60-259154 | 12/1985 | Japan | 426/557 |
| 62-11064 | 1/1987 | Japan | 426/557 |
| 63-271 | 1/1988 | Japan | 426/557 |
| 64-85048 | 3/1989 | Japan | 426/557 |
| 1168250 | 7/1989 | Japan | 426/557 |
| 4200361 | 7/1992 | Japan | 426/557 |
| 515331 | 1/1993 | Japan | 426/557 |
| 549427 | 3/1993 | Japan | 426/557 |

OTHER PUBLICATIONS

Technology of Food Preservation pp. 290–299 4th Ed, Desrosier et al, Avi Publ 1977.

*Primary Examiner*—Steven Weinstein
*Attorney, Agent, or Firm*—Brooks Haidt Haffner & Delahunty

[57] ABSTRACT

A shelf-stable, uncooked or partially cooked moist pasta is produced by treating freshly extruded or sheeted pasta with steam to set the pasta surface, immersing the steam treated pasta in an aqueous solution containing acidulants and/or humectants, partially drying to remove surface moisture, sealing the pasta in a container, and thermally pasteurizing the pasta while it is in the container using conventional thermal processes or microwave treatment. The pasta thus produced is shelf-stable under non-refrigerated conditions and has an equivalent or better texture, color and flavor than commercially available, fresh refrigerated pastas.

19 Claims, No Drawings

METHOD OF MAKING SHELF STABLE MOIST PASTA

This application is a continuation of application Ser. No. 08/067,185, filed May 26, 1993, now abandoned.

BACKGROUND OF THE INVENTION

1. Field of the Invention

The present invention relates to shelf-stable moist pasta. More particularly, the invention has to do with uncooked and partially cooked pasta which is moist and shelf-stable and methods of manufacturing and packaging the pasta.

2. Description of Related Art

There is a consumer demand for moist pasta products which are fresh tasting and have good microbiological quality. Shelf-stable moist pastas are particularly attractive to the retailer and consumer because they do not require refrigeration.

Uncooked and partially cooked moist pastas, which generally are defined as moist pastas which are not fully cooked, are flexible and have a moisture content between about 15 and 38 percent, have been described in U.S. Pat. Nos. 4,529,609 and 4,540,590. Both patents describe combinations of formulation, steaming and thermal pasteurization to produce shelf-stable, uncooked moist pasta. The disadvantage of the approach disclosed, however, is that they require the direct addition of salt and acids into the dough mix. This impairs pasta quality, particularly pasta texture and appearance.

Another type of moist pasta is pre-cooked moist pasta, which generally is defined as moist pasta that is fully-cooked and has more than thirty-eight percent moisture preferably between sixty and seventy-five percent moisture.

The pre-cooked moist pastas have been prepared by the combination of formulation treatment, either by direct addition of acid and/or salt, or immersion in acid and/or salt solution, steaming and thermal pasteurization to achieve shelf-stability. These approaches are disclosed in U.S. Pat. Nos. 4,597,976; 4,599,238 and 4,734,291. The major drawback of these pre-cooked moist pastas is that they have a soggy/mushy texture because the moisture difference between the core and surface portion of the cooked pasta is lost. Freshly cooked pasta has a core that was just cooked and its moisture content is relatively limited compared with the surface portion. This moisture difference is responsible for the "al dente" texture. However, as fully cooked pasta is allowed to stand after cooking, the moisture difference between the core and the surface of the pasta disappears and the "al dente" texture is lost. The pasta becomes soggy and mushy, which is the case for most pre-cooked pasta.

U.S. Pat. No. 4,789,553 discloses a method of reducing thermal processing requirements for retorting pre-cooked low acid foods by using aldonic acid and its lactone. The aldonic acid and its lactone are said to reduce thermal requirements for commercial retort sterilization and produce a product flavor similar to that of freshly prepared home-cooked pasta with no typical acid taste. Although the reduced thermal processing requirements help to improve texture and flavor, such retorted pre-cooked pasta has the textural disadvantages of sogginess and mushiness which are found in typical pre-cooked pasta. Most retorted pre-cooked pasta shows even worse textural characteristics than typical non-retorted pre-cooked pasta due to extended cooking processes normally associated with the retort process.

The present invention provides a microbiological shelf-stable uncooked or partially cooked pasta having superior texture and flavor and excellent appearance and color.

SUMMARY OF THE INVENTION

A shelf-stable, uncooked or partially cooked moist pasta is produced by treating freshly extruded or sheeted pasta with steam to set the pasta surface. The steam treated pasta then is immersed in an aqueous solution containing acidulants and/or humectants to reduce the pH, the water activity (abbreviated herein as "Aw"), or both the pH and Aw to levels which inhibit microbial growth. Following immersion, the pasta is partially dried to remove surface moisture. Then it is sealed in a container under partial vacuum, and thermally pasteurized in the container using conventional thermal processes or microwave treatment. The moist pasta thus produced is shelf-stable under non-refrigerated conditions and has an equivalent or better texture, color and flavor than commercially available, fresh refrigerated pastas.

DESCRIPTION OF THE PREFERRED EMBODIMENTS

The shelf-stable moist pasta of the present invention has a moisture content of from about 15% to about 38%, preferably from about 20% to about 30%. The pasta is stabilized by reducing its pH below about 4.6 or by reducing its Aw below about 0.85. Both the pH and Aw can be reduced if desired. While it is not necessary to employ preservatives in the pasta of the invention, preservatives can be used if it is desired to enhance further the shelf stability.

The term water activity (Aw) is defined herein as the ratio of the vapor pressure of water in the product to the vapor pressure of pure water at the same temperature. It is numerically equal to 1/100 th of relative humidity generated by the product in a closed system. The relative humidity can be calculated from direct measurement of partial vapor pressure or dew point or measured directly by sensors whose physical or electrical characteristics are altered by the relative humidity to which they are exposed. Instruments are checked or calibrated on the basis of the relative humidity generated by standard salt solutions.

The starting material for the present invention is a fresh pasta which can be made using conventional ingredients, processes and equipment. Any suitable material from wheat can be used to make the pasta, such as semolina, farina and flours derived from hard or soft wheat, durum wheat and the like. Flavorants, colorants and other standard ingredients used in making pasta may be added to the flour. The amount of water mixed with the flour and other ingredients is generally from about 17.5% to about 30%, preferably from about 20% to about 28%, by weight based on flour. The optimum amount of water depends on the type of flour used and can be determined by one skilled in the art.

The flour, water and other ingredients are mixed into a dough with any mixer which can ensure complete mixing of flour and water so that substantially no flour is left unmixed. Suitable mixers include a Hobart mixer (available from Hobart Corp., Troy, Ohio, U.S.A.) or the mixing compartment which is attached to most pasta extruders.

Freshly extruded or sheeted raw pastas are examples of suitable types of fresh pasta starting materials. Pasta prepared by extrusion is especially preferred. The pasta can have various shapes and thicknesses, such as spaghetti, elbow macaroni, spirals, linguine and shells having thicknesses from about 0.5 millimeters (hereinafter "mm") to about 2.5 mm and preferably from about 1.0 mm to about 2.0 mm.

The fresh pasta is subjected to steam treatment to set the pasta surface by effectively denaturing the surface protein matrix. This step is required to maintain surface structural integrity during subsequent processing, particularly the immersion step, and also the thermal processing step. Structural disintegration is accordingly minimized by steam treatment.

Steam treatment can be carried by subjecting the pasta to food grade steam in a steamer at atmospheric pressure for from about 0.5 to about 2.0 minutes. The steam treatment conditions depend primarily on the size of the steamer and the pasta shape and can easily be determined by those skilled in the art.

Following steam treatment, acidulants, humectants, or acidulants and humectants are incorporated into the pasta by immersion into a suitable aqueous solution. It has been found that when acidulants and/or humectants are incorporated into the pasta during dough mixing, they interact undesirably with the protein and starch components of the pasta and the formation of a desirable protein matrix is impaired. The resulting pasta has poor texture and appearance. In contrast, the process of the present invention allows the formation of the internal pasta structure without the undesirable influence of acidulants and humectants. In addition, the step of steam treatment fixes the protein matrix structure of the pasta surface so that the pasta can maintain its structural integrity during its subsequent immersion into acidulants and/or humectants. The resulting pasta has excellent texture and appearance.

The acidulants which can be employed in the present invention are aqueous solutions of food grade acids such as citric, lactic, fumaric, tartaric or malic acid, glucono delta lactone, or mixtures thereof. The pH of the acidulants ranges from about 1.5 to about 3.5 depending on their concentrations. An efficient and preferred acidulant is an aqueous solution of citric and lactic acids wherein the acids are present in a weight ratio from about 40:60 to about 60:40 and a total concentration from about 2% to about 4% by weight, and the solution has a pH from about 1.5 to about 3.5. When this combination of acids is used, the taste of the pasta after it is cooked is barely distinguishable from a non-acidified control because most of the acids are leached out in the cooking water.

Food grade humectants such as sodium chloride, propylene glycol, glycerol or mixtures thereof are used when a humectant is employed. Sodium chloride is preferred because it is efficient, and the taste of the pasta after it is cooked is barely distinguishable from a control with no sodium chloride because most of the sodium chloride is leached out in the cooking water. A preferred sodium chloride solution comprises from about 10% to about 20% sodium chloride by weight.

An aqueous solution of acidulants and humectants which is comprised of a mixture of one or more food grade acids and humectants also can be employed. A preferred aqueous mixture comprises citric and lactic acids in a weight ratio from about 40:60 to about 60:40 and a total concentration from about 2% to about 4% by weight, and from about 10% to about 20% by weight sodium chloride. The solution has a pH from about 1.5 to about 3.5.

The immersion process is carried out so that the acidulants, humectants, or acidulants and humectants penetrate the moist pasta uniformly through fine capillaries in the pasta. The steam treated pasta is immersed in the acidulant, humectant, or acidulant and humectant solution for a sufficient time to cause the pH and/or Aw of the pasta to drop below the measure required to achieve the desired microbial stability (i.e., below a pH of 4.6 and/or below an Aw of 0.85). The immersion time will vary with the thickness of the pasta, the concentration of the acidulant and/or humectant, and the relative weight of the pasta to the weight of the solution. Generally, longer immersion times are required for thicker pastas, shorter times are required for more concentrated acidulant and/or humectant solutions, and shorter times are required as the weight ratio of pasta to the weight of solution is decreased. The amount of solution used is generally from about 10 to about 20 parts by weight of solution per part by weight pasta. Sufficient immersion times generally range from about 1.0 minutes to about 4.0 minutes.

When an acidulant is employed, the steam treated pasta is immersed in the acidulant solution for a sufficient time to cause the pH of the pasta to fall below about 4.6, preferably to a pH from about 3.9 to about 4.2. When a humectant is employed, the steam treated pasta is immersed in the humectant solution for a sufficient time to allow humectants to penetrate the pasta sufficiently to cause the Aw of the pasta to fall below about 0.85, preferably to an Aw from about 0.81 to about 0.83, after subsequent partial drying. When acidulants and humectants are employed together, the steam treated pasta is immersed in the solution for a sufficient time to cause the pH of the pasta to fall below about 4.6 and the Aw to fall below about 0.85 after partial drying.

Following the immersion step, the pasta is partially surface dried to improve moist pasta handling properties during subsequent processing. Partial surface drying also can slightly adjust the Aw of the pasta to a preferred range of from about 0.82 to about 0.84 while maintaining pasta flexibility.

The partial surface drying step can be carried out by subjecting the immersion treated pasta to ambient conditions, generally from about 15° C. to about 30° C., until the moisture on the pasta surface dries up, but while the pasta still is pliable.

After the pasta has been partially surface dried, it is sealed in a package and pasteurized. In a preferred embodiment, the pasta is packaged under partial vacuum, preferably from about 340 mmHg to about 400 mmHg, in a sealed plastic container. Then the pasta is pasteurized by thermal processing. Packaging under partial vacuum is preferred because excess air is removed which improves storage stability by minimizing oxidative flavor changes. The elimination of excess air also improves the heat penetration during the pasteurization process, thereby reducing the processing time and temperature required to achieve the desired level of pasteurization.

The plastic container can be any food grade, high temperature stable packaging system having good gas and moisture barrier properties. Suitable containers include pouches made of a multi-layered film having a liner of low density polyethylene, a layer of standard polyethylene and a polypropylene sealant. Other suitable materials include Mylar, Saran and ethyl vinyl alcohol.

The temperature and time required for thermal processing depend upon the fill temperature, the geometry of the container and the product characteristics. It is essential that the center of the pasta, at the coldest spot in the container, must reach the minimum pasteurization temperature. The temperature at the coldest spot, therefore, should reach from about 80° C. to about 110° C. for a period of from about 5 to about 60 minutes, and preferably from about 95° C. to about 100° C. for a period of from about 10 to about 20 minutes. When the pasta is packaged in a pouch, the heat processing is preferably carried out under pressure, preferably from about 0.5 to about 1.0 bar, to prevent swelling of the pouch. Thermal processing can be carried out by, for example, boil-in-bag processing, steaming, microwave pasteurization or a combination thereof.

The shelf-stable moist pasta produced according to the invention retains its integrity as to texture, appearance and sensory properties. The product is ready for use in a manner similar to home cooked dry pasta.

EXAMPLES

EXAMPLE 1

Fresh spaghetti was made of durum semolina. Its diameter ranged from 0.068 to 0.070 inch and it had a moisture content of 30% by weight. The freshly extruded spaghetti was steam-treated for 0.5 minutes at atmospheric pressure.

An acid solution was made of 30 grams of lactic acid and 30 grams of citric acid in 1940 grams of water and the steam-treated moist spaghetti (200 grams) was immersed in the solution for 2.0 to 3.0 minutes to lower the pH of the spaghetti to below 4.6. The acidified spaghetti was partially dried under ambient conditions for about 10 minutes to obtain a moisture content between 20% and 22%. One hundred and ten grams of the partially dried moist spaghetti was packaged in a flexible pouch and sealed under partial vacuum ranging from 340 to 400 mmHg. The packaged spaghetti was thermally treated by steam at 212° F. for 20 minutes and then cooled to 150° F. at ambient conditions.

Moist spaghetti pouches made according to this example were stored for six months with no evidence of deterioration or growth of microorganisms. The spaghetti, after six months storage at room temperature, was firm and had no off-taste. Some of the sterilized pouches were stored at 90° F. and inspected monthly. No evidence of deterioration was seen after six months of storage even at this elevated temperature.

EXAMPLE 2

Fresh spaghetti was made and steam-treated in the same way as for Example 1. The steam-treated moist spaghetti (200 grams) was immersed in a brine solution containing 300 grams of sodium chloride in 1700 grams of water for 2.0 to 3.0 minutes. The immersion treated spaghetti was partially dried under ambient conditions for about 10 minutes to obtain a moisture content between 20% and 22%. The resulting equilibrium Aw of the spaghetti was 0.83. One hundred and ten grams of the partially dried moist spaghetti was packaged in a flexible pouch and sealed under partial vacuum ranging from 340 to 400 mmHg. The packaged moist spaghetti was thermally treated by steam at 212° F. for 20 minutes and then cooled to 150° F. at ambient conditions.

Moist spaghetti pouches made according to this example were stored for six months with no evidence of deterioration or growth of microorganisms. The spaghetti, after six months storage at room temperature, was firm and had no off-taste. Some of the sterilized pouches were stored at 90° F. and inspected monthly. No evidence of deterioration was seen after six months of storage even at this elevated temperature.

EXAMPLE 3

Fresh spaghetti was made and steam-treated in the same way as for Example 1. An aqueous solution was made of 30 grams of lactic acid, 30 grams of citric acid and 300 grams of sodium chloride in 1640 grams of water and the steam-treated moist spaghetti (200 grams) was immersed in the solution for 2.0 to 3.0 minutes. The immersion treated spaghetti was partially dried under ambient conditions for about 10 minutes to obtain a moisture content between 20% and 22%. The resulting Aw and pH of the spaghetti were 0.82 and 4.3, respectively. One hundred and ten grams of the partially dried moist spaghetti was packaged in a flexible pouch and sealed under partial vacuum ranging from 340 to 400 mmHg. The packaged moist spaghetti was thermally treated by steam at 212° F. for 20 minutes and then cooled to 150° F. at ambient conditions.

Moist spaghetti pouches made according to this example were stored for six months with no evidence of deterioration or growth of microorganisms. The spaghetti, after six months storage at room temperature, was firm and had no off-taste. Some of the sterilized pouches were stored at 90° F. and inspected monthly. No evidence of deterioration was seen after six months of storage even at this elevated temperature.

EXAMPLE 4

An aqueous dispersion of 0.2 to 0.3% potassium sorbate was prepared. A durum flour was then mixed with the dispersion in an extruding press and fresh spaghetti was produced having a diameter ranging from 0.068 to 0.070 inch and a moisture content of 30% by weight. The freshly extruded spaghetti was steam-treated for 0.5 minutes at atmospheric pressure.

An aqueous solution was made of 30 grams of lactic acid, 30 grams of citric acid and 300 grams of sodium chloride in 1640 grams of water and the steam-treated moist spaghetti (200 grams) was immersed in the solution for 2.0 to 3.0 minutes. The immersion treated spaghetti was partially dried under ambient conditions for about 10 minutes to obtain a moisture content between 20% and 22%. The resulting Aw and pH of the spaghetti were 0.82 and 4.3, respectively. One hundred and ten grams of the partially dried moist spaghetti was packaged in a flexible pouch and sealed under partial vacuum ranging from 340 to 400 mmHg. The packaged moist spaghetti was thermally treated by steam at 212° F. for 20 minutes and then cooked to 150° F. at ambient conditions.

Moist spaghetti pouches made according to this example were stored for six months with no evidence of deterioration or growth of microorganisms. The spaghetti, after six months storage at room temperature, was firm and had no off-taste. Some of the sterilized pouches were stored at 90° F. and inspected monthly. No evidence of deterioration was seen after six months of storage even at this elevated temperature.

All percentages set forth herein are by weight unless otherwise specifically designated.

Having set forth a description of the invention and some specific examples, the scope is now more particularly set forth in the appended claims.

What is claimed is:

1. A method of making an uncooked moist pasta product having a firm texture and no off-taste after six months of storage under non-refrigerated conditions, said method consisting essentially of the sequential steps of:

a) preparing a fresh uncooked pasta;

b) subjecting the fresh uncooked pasta to steam treatment for from about 0.5 to about 2.0 minutes to set the pasta surface and maintain structural integrity of the uncooked pasta;

c) immersing the steam treated, uncooked pasta in an acidulant, a humectant or a mixture of an acidulant and a humectant to reduce the pH level, the water activity level, or both the pH and water activity levels to levels which inhibit microbial growth;

d) partially drying the uncooked pasta to a moisture content of from about 15 to about 38 percent, following immersing;

e) sealing the partially dried, uncooked pasta in a container; and f) pasteurizing the uncooked pasta in the container, wherein the uncooked pasta has a firm texture and no off taste and is shelf stable after six months of storage under non-refrigerated conditions.

2. The method of claim 1 wherein the partially drying is to a moisture content of from about 20 to about 30 percent.

3. The method of claim 1 wherein the steam treated pasta is immersed in the acidulant for a sufficient time to cause the pH of the pasta to fall below about 4.6.

4. The method of claim 3 wherein the acidulant is selected from the group consisting of citric acid, lactic acid, fumaric acid, tartaric acid, malic acid and glucono delta lactone.

5. The method of claim 3 wherein the acidulant comprises an aqueous solution of citric acid and lactic acid and the acids are present in a weight ratio from about 40:60 to about 60:40 and the solution has a pH from about 1.5 to about 3.5.

6. The method of claim 1 wherein the Steam treated pasta is immersed in the humectant for a sufficient time to cause the water activity of the pasta to fall below about 0.85 after the subsequent partial drying.

7. The method of claim 6 wherein the humectant is selected from the group consisting of sodium chloride, propylene glycol and glycerol.

8. The method of claim 6 wherein the humectant is an aqueous solution of sodium chloride which comprises from about 10 to about 20 percent sodium chloride by weight.

9. The method of claim 1 wherein the steam treated pasta is immersed in the mixture of an acidulant and a humectant for a sufficient time to cause the water activity of the pasta to fall below about 0.85 after the subsequent partial drying and the pH of the pasta to fall below about 4.6.

10. The method of claim 9 wherein the humectant is selected from the group consisting of sodium chloride, propylene glycol and glycerol, and the acidulant is selected from the group consisting of citric acid, lactic acid, fumaric acid, tartaric acid, malic acid and glucono delta lactone.

11. The method of claim 1 wherein the partially dried pasta is sealed in a container under a partial vacuum of from about 340 mmHg to about 400 mmHg before pasteurizing.

12. The method of claim 1 wherein immersing is for a period of from about 1 to about 4 minutes.

13. A method of making a partially cooked moist pasta product having a firm texture and no off taste after six months of storage under non-refrigerated conditions, said method consisting essentially of the sequential steps of:

a) preparing a fresh pasta;

b) subjecting the fresh pasta to steam treatment for from about 0.5 to about 2.0 minutes to set the pasta surface and maintain structural integrity of the pasta;

c) immersing the steam treated pasta in an acidulant, a humectant or a mixture of an acidulant and a humectant to reduce the pH level, the water activity level, or both the pH and water activity levels to levels which inhibit microbial growth;

d) partially drying the pasta a to a moisture content of from about 15 to about 38 percent, following immersing;

e) sealing the partially dried pasta in a container; and f) pasteurizing the pasta in the container, wherein the pasta has been partially cooked during the process and the partially cooked pasta has a firm texture and no off taste and is shelf stable after six months of storage under non-refrigerated conditions.

14. The method of claim 13 wherein the partially drying is to a moisture content of from about 20 to about 30 percent.

15. The method of claim 13 wherein the steam treated pasta is immersed in the acidulant for a sufficient time to cause the pH of the pasta to fall below about 4.6.

16. The method of claim 13 wherein the steam treated pasta is immersed in the humectant for a sufficient time to cause the water activity of the pasta to fall below about 0.85 after the subsequent partial drying.

17. The method of claim 13 wherein the steam treated pasta is immersed in the mixture of an acidulant and a humectant for a sufficient time to cause the water activity of the pasta to fall below about 0.85 after the subsequent partial drying and the pH of the pasta to fall below about 4.6.

18. The method of claim 13 wherein the partially dried pasta is sealed in a container under a partial vacuum of from about 340 mmHg to about 400 mmHg before pasteurizing.

19. The method of claim 13 wherein immersing is for a period of from about 1 to about 4 minutes.

* * * * *